J. T. GALLAHER.
AUTOMATIC MILEAGE REGISTERING AND AUDITING APPARATUS.
APPLICATION FILED AUG. 20, 1910.

1,039,724.

Patented Oct. 1, 1912.
5 SHEETS—SHEET 1.

WITNESSES:
R.E.Hamilton.
M. Cox.

INVENTOR.
J.T.Gallaher,
BY
F.G.Fischer,
ATTORNEY.

J. T. GALLAHER.
AUTOMATIC MILEAGE REGISTERING AND AUDITING APPARATUS.
APPLICATION FILED AUG. 20, 1910.

1,039,724.

Patented Oct. 1, 1912.
5 SHEETS—SHEET 2.

WITNESSES:
R. Hamilton
M. Cox.

INVENTOR:
J. T. Gallaher,
BY
F. G. Fischer
ATTORNEY.

J. T. GALLAHER.
AUTOMATIC MILEAGE REGISTERING AND AUDITING APPARATUS.
APPLICATION FILED AUG. 20, 1910.

1,039,724.

Patented Oct. 1, 1912.

WITNESSES:
R. Hamilton
M. Cox

INVENTOR:
J. T. Gallaher,
BY F. G. Fischer,
ATTORNEY.

J. T. GALLAHER.
AUTOMATIC MILEAGE REGISTERING AND AUDITING APPARATUS.
APPLICATION FILED AUG. 20, 1910.

1,039,724.

Patented Oct. 1, 1912.

WITNESSES:
R. L. Hamilton
M. Cox.

INVENTOR:
J. T. Gallaher,
BY
F. G. Fischer,
ATTORNEY.

J. T. GALLAHER.
AUTOMATIC MILEAGE REGISTERING AND AUDITING APPARATUS.
APPLICATION FILED AUG. 20, 1910.

1,039,724.

Patented Oct. 1, 1912.
5 SHEETS—SHEET 5.

WITNESSES:
R. E. Hamilton
M. Cox.

INVENTOR:
J. T. Gallaher,
BY F. G. Fischer,
ATTORNEY.

UNITED STATES PATENT OFFICE.

JAMES T. GALLAHER, OF KNOBNOSTER, MISSOURI.

AUTOMATIC MILEAGE REGISTERING AND AUDITING APPARATUS.

1,039,724.   Specification of Letters Patent.   Patented Oct. 1, 1912.

Application filed August 20, 1910. Serial No. 578,239.

*To all whom it may concern:*

Be it known that I, JAMES T. GALLAHER, a citizen of the United States, residing at Knobnoster, in the county of Johnson and State of Missouri, have invented certain new and useful Improvements in Automatic Mileage Registering and Auditing Apparatus, of which the following is a specification.

My invention relates to apparatus to be carried on railway passenger cars, for automatically recording the points at which passengers enter or leave a car, and the number of passengers entering or leaving a car during a trip.

The object is to provide a recording apparatus of this kind which cannot be tampered with by either employees or passengers.

The apparatus herein shown and described for accomplishing the said operations, comprises a car provided with slightly yieldable steps, each step being independent of the adjacent steps; means for feeding a strip of paper longitudinally; means for pricking, indenting or marking the paper strip; electro-magnets for actuating the pricking means; magnet energizing circuits closed by depression of the respective steps by any person entering or leaving the car; and means controlled by the travel of the car for recording the distance in miles from the starting point, upon the same strip of paper.

The apparatus further embodies minor devices which will be hereinafter described.

In order that the invention may be fully understood, reference will now be made to the accompanying drawings, in which.

Referring first to Figs. 9, 10 and 11, 1, 2 and 3 indicate the movable treads of the car steps, and 4 indicates the solid or unyielding supports thereof. Each tread is hinged or pivoted as shown at 5, and its forward edge is yieldably supported by springs 6. Mounted on the respective treads and supports 4 are circuit closing points 7 which are normally separated, and connected to these are conductors $8^a$, $9^a$, which are connected as shown in Fig. 5, and hereinafter described.

Figures 4, 11, 12:
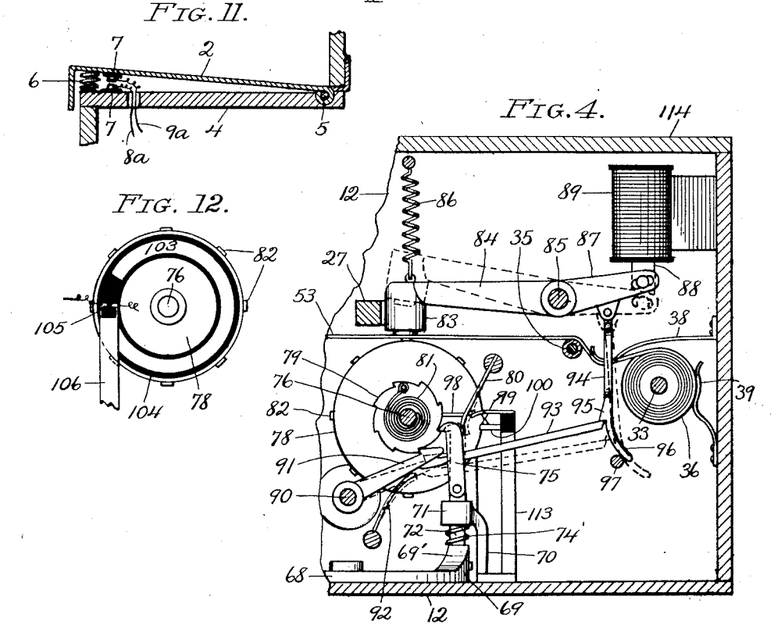
Fig. 4 is a view similar to Fig. 1, showing certain parts in different positions.
Fig. 11, is a vertical section of one step, on the line XI—XI of Fig. 9.
Fig. 12, is a detail view in elevation of the contact devices upon the numeral wheel.
Figure 9:
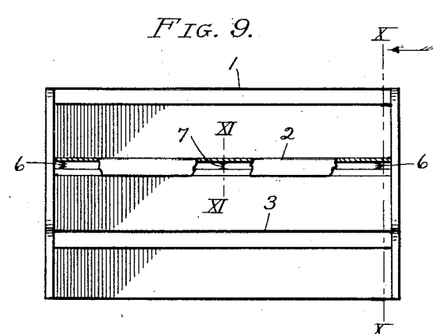
Fig. 9 is a front elevation of three car steps constructed according to the invention.
Figure 10:
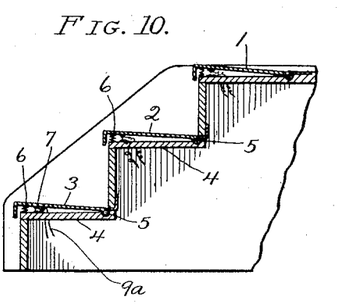
Fig. 10 is a section on the line X—X of Fig. 9.

Each of the four sets of steps of the car is to be constructed as shown in Figs. 9, 10 and 11.

Figure 5:
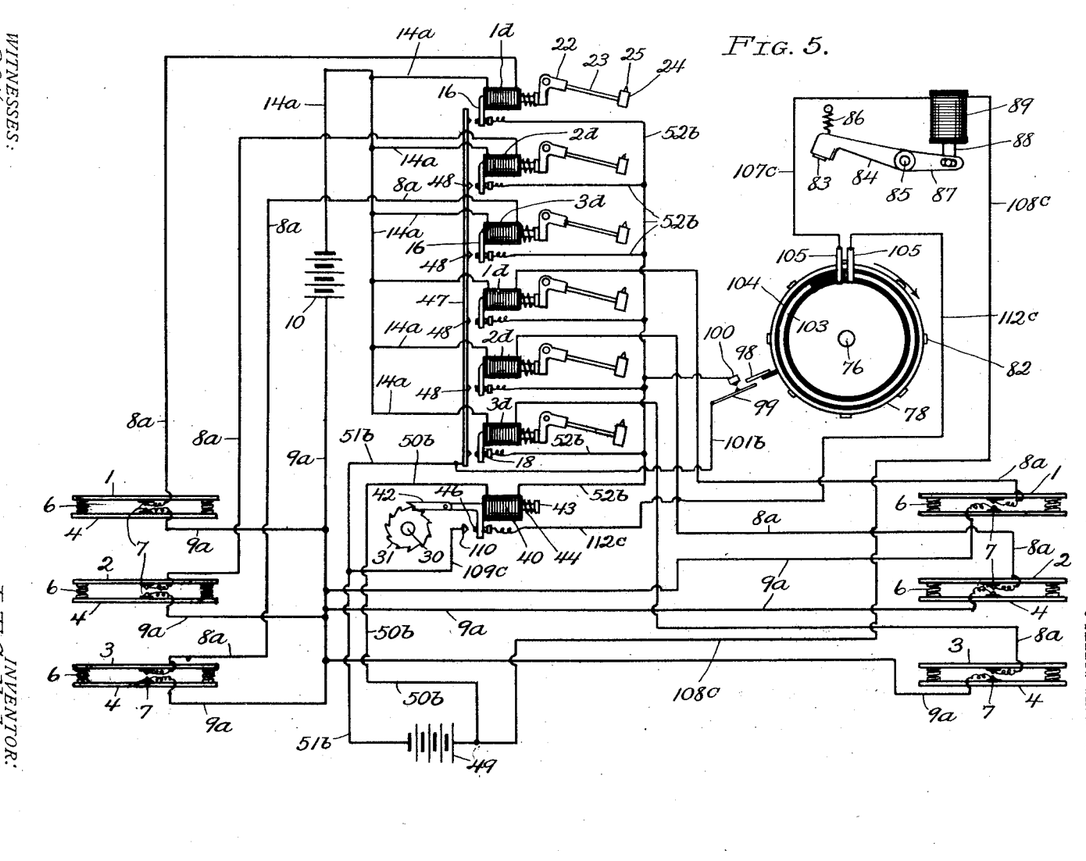
Fig. 5 is a circuit diagram for the apparatus required for two sets of steps, the latter being shown at the right and left, respectively.

In the circuit diagram, Fig. 5, two sets of steps are represented, two sets being as fully illustrative as four.

12 indicates a box or casing in which the recording mechanism is housed. It may be positioned at any desired point in the car, but is shown on the car floor in Figs. 6 and 7, for simplicity of illustration. Mounted upon a transverse bar 13 within said box are a series of solenoids $1^d$, $2^d$, $3^d$, each solenoid being appropriated to one of the steps and being electrically connected to that step, by the conductor $8^a$. The lower contacts 7 are all connected to the current source 10 by the conductors $9^a$, and the battery 10 is connected to all of the solenoids $1^d$, $2^d$, $3^d$, by the conductors $14^a$.

Each solenoid has a core, 15, having a lateral finger 16 on one end and a head 17 on the other end thereof. Each finger 16 carries an adjustable contact point 18. Each core 15 is held in the position shown, by a spring 19, confined between the core head 17 and the solenoid head.

Pivoted on a rod 20, in bearings 21, are a series of angle levers 22, having depending heels which respectively contact the core heads 17. Each lever 22 carries a rod 23, on the end of which is a weight 24 upon which is mounted a point or marker 25 that is adapted to prick, mark or indent a strip of paper when upwardly actuated. When the rods 23 are clear down they rest upon a transverse rod 26 which prevents the heels of levers 22 from following the solenoid cores when the latter are drawn leftwardly into the coils.

When a solenoid is energized its core is moved to the left, compressing the spring 19, and when the magnet is deënergized the spring expands suddenly, throwing the weight 24 upward above its starting position after which the weight descends until lever 22 strikes the head of the magnet core, and when the latter is drawn in by reason of the magnet being energized, the weight continues to descend until its rod 23 strikes the stop 26. The object of this construction, that is, of actuating the markers by spring power instead of directly by the magnets,— is that I prefer to make the magnet actuated stroke of the core accomplish the operation of the strip-feeding device (presently described) so that the strip shall always be advanced just before the marker 25 operates. This construction is not essential, however, as the marker 25 may be actuated by the direct stroke of the magnet core, and the relay device, by the return stroke thereof.

Fixed above the row of prickers 25 is a transverse bar 27, whose under side is provided with a pad or platen 28 of rubber or like suitable material.

Mounted rotatably in bearings 29 is a reel shaft 30, on which is fixed a ratchet wheel 31. Adjacent said shaft is a paper guide roller 32. At the opposite side of the casing is a reel shaft 33, journaled in bearings 34. Adjacent said shaft is a paper guide roller 35.

36 represents a roll of paper which is first placed upon the shaft 33, its outer end being led over roller 35, beneath the platen 28, over roller 32, and fastened to the take-up shaft 30. The rolls upon the two shafts are engaged by suitable friction springs 37, 38 and 39, which prevent the forming of slack and cause close winding upon shaft 30.

Mounted upon the cross bar 13 in line with the ratchet 31 is a paper-feed solenoid 40, the core 41 of which carries a pivoted pawl 42 for actuating the ratchet. At its other end, said core is provided with a head 43 between which and the magnet head is an expansion spring 44, which retracts the core after each operative stroke thereof. Carried by the core 41 is a contact finger 45, provided with an adjustable contact point 46.

Mounted in alinement with the row of movable contact points 18, is a metallic strip 47, provided with contact points 48, Fig. 5, adapted to be respectively struck by said points 18. The paper-feed magnet 40 is so connected with a current source 49 and the contact pieces 18, 47, that it will be energized by the closure of any point 18. Thus the magnet 40 is connected by a wire $50^b$, with the battery 49; the battery 49 is connected with a wire $51^b$ with the strip 47; and the movable contact pieces 18 are connected by wires $52^b$ with the terminal of magnet 40 not connected to wire $50^b$. It will be evident that each of the pricker solenoids $1^d$, $2^d$, and $3^d$, may act as a relay to energize the paper feed-solenoid 40.

The operation of the mechanism already described will therefore be as follows: Suppose that any person steps upon a lower step 3, to board the car: a circuit will be closed through battery 10 and one of the solenoids $3^d$; the finger 16 moves point 18 into contact with strip 47, closing a circuit through battery 49 and the paper-feed magnet 40, which instantly shifts the ratchet 31 thereby shifting the paper strip 53 a short distance; the core of the said pricker solenoid $3^d$ is retracted by its spring, opening the paper-feed circuit and actuating the pricker 24—25 as above described. The point 25 penetrates the paper, leaving a mark at (say) the point designated $g^3$, in Fig. 13. Explaining the figure, the upper longitudinal row of marks is produced by the device controlled by one of the top steps, 1; the second and third rows being produced by the device controlled by the middle and lower steps 2, 3, respectively. The lower group of three rows pertains to one of the two sets of steps shown in Fig. 5. The strip is intermittently advanced in the direction of the arrow, by the action of the solenoid 40, which is energized by the initial operation of any pricker magnet $1^d$, $2^d$, $3^d$. When the person above referred to treads upon the second step, 2, the solenoid $2^d$ is energized and causes, first, the magnet 40 to shift the paper; second, the pricker corresponding to magnet $2^d$ to mark the paper at $g^2$. When the top step, 1, is depressed, the magnet $1^d$ will be energized, thereby operating the paper-feed mechanism again and causing the paper to be marked at $g^1$. Thus the three marks $g^1$, $g^2$, and $g^3$, disposed in an oblique line as shown, indicate that some person boarded the car at a certain point. As the strip is advanced in the direction of the arrow, it will be readily understood that when any person gets off the car by way of the steps, the successive depressals of the steps will cause a row of three marks as $f^1$, $f^2$, and $f^3$, to be formed upon the paper at an angle differing from the angle of the marks $g^1$, $g^2$ and $g^3$. This difference of angle enables the accountant to distinguish at a glance the "entering" records from the "leaving" records. It will also be evident that every passenger carried within the car will cause six perforations or marks to be recorded upon the strip; three marks when entering the car, and three when leaving the car.

Records made by members of the train crew by entering and leaving the car may be subtracted from the total number of records by keeping count of the number of necessary entrances and exits of the conductor, brakemen, etc.

The third object of my invention,—to record the distances at which persons get on and off the car, is carried into practice by means of the mechanism illustrated in Figs. 1, 2, 3, 4, 6, 7, 8, and 12, and diagrammatically in a part of Fig. 5.

Figure 6:
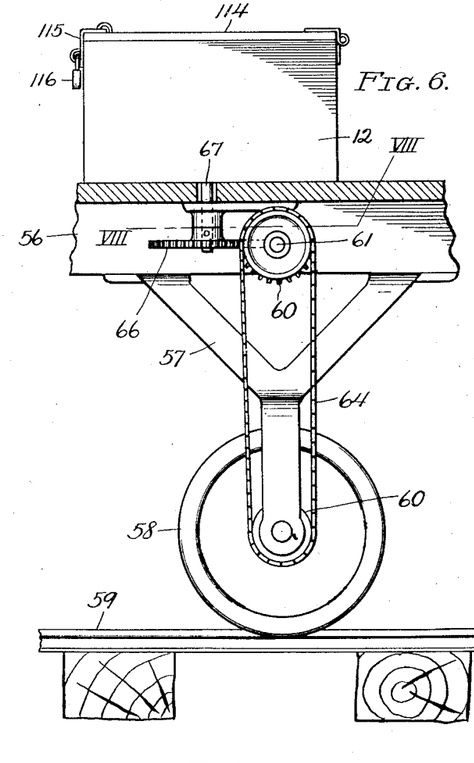
Fig. 6, is a diagrammatic, side-elevation of a driving mechanism actuated by a track wheel.
Figure 7:
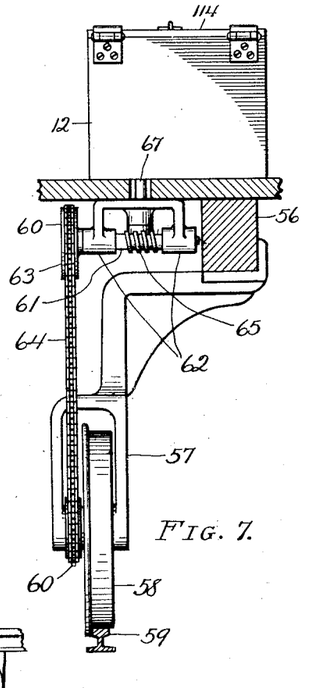
Fig. 7 is an end elevation of the same.
Figure 8:
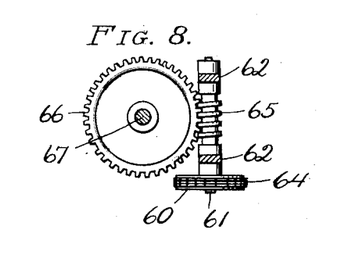
Fig. 8 is a section of the worm gear, on the line VIII—VIII of Fig. 6.

Referring first to Figs. 6, 7, and 8: 56 designates the under frame of the car; 12, the box in which the mechanism is housed; 57, a depending bracket which carries a wheel 58, that frictionally engages the track 59; 60, a sprocket wheel keyed to the track wheel 58; 61, a countershaft journaled in a bracket 62; 63, a sprocket wheel on shaft 61 and connected by a link belt 64 with the driving sprocket 60. Keyed upon shaft 61 is a worm 65, which drives a gear wheel 66, fixed upon a vertical shaft 67 that extends up into the box 12.

Figure 1:
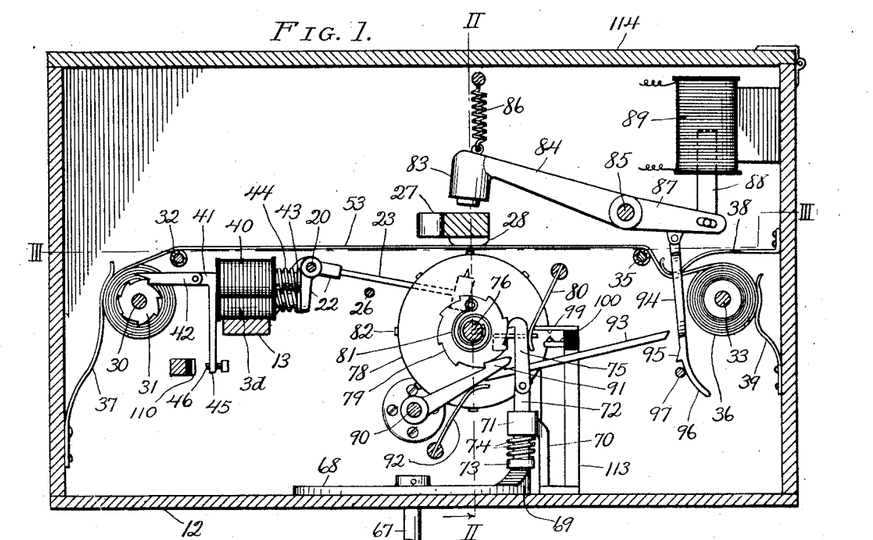
Figure 1 is a vertical section, on the line I—I of Fig. 3, of the principal parts of a mechanism constructed according to the invention.
Figure 3:
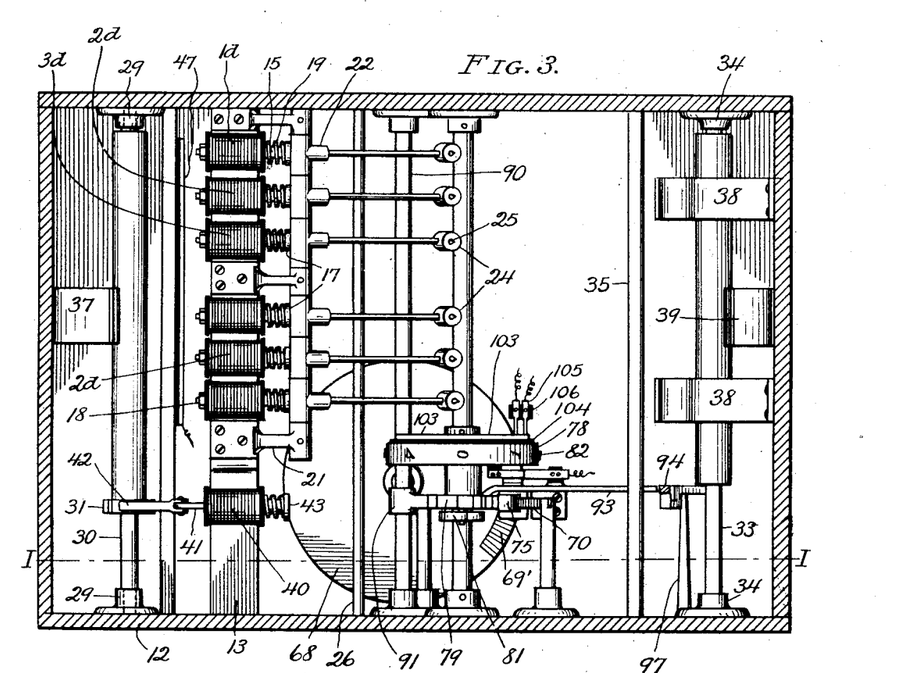
Fig. 3 is a horizontal section on the line III—III of Fig. 1, omitting the record strip.

Referring now to Figs. 1, 3 and 4: a cam wheel 68 is keyed upon the shaft 67 adjacent the bottom of the box, said wheel being provided with a cam 69, having an inclined face 69′ terminating in an abrupt drop 69″. Secured to the bottom of the casing is a post 70, provided with a guide 71, in which is vertically slidable a pawl-slide 72, having a head 73, (Fig. 1) pressed downwardly by a spring 74. An upwardly extending pawl 75 is pivotally connected to the pawl-slide 72.

76, is a shaft, held non-rotatably in bearings 77. Rotatably mounted on this shaft is a numeral printing wheel 78, hereinafter called the numeral wheel, integral with which is a ratchet wheel 79. The driving pawl 75 is pressed against said ratchet by a spring 80.

81 is a spiral spring whose ends are secured to the shaft 76 and the face of the ratchet 79, respectively; said spring being arranged to be tensioned or "wound up" when the ratchet is turned by the pawl 75. In Fig. 1 the spring is shown in relaxed position, and in Fig. 4, it is shown in tensioned or wound up position.

Upon the periphery of the numeral wheel 78 are a plurality of equally spaced numeral type 82, which are consecutively numbered 0, 1, 2, 3, etc. up to a predetermined number. Each type 82 represents one mile of distance, and the number of teeth on the ratchet wheel 79 is equal to the number of the type 82, so that each revolution of the cam wheel will cause the type-wheel to be turned a distance from the center to center of two consecutive type. Of course the cam-wheel shaft 67 is so geared to the track wheel 58 as to make one revolution per mile.

When the cam surface 69 of cam 68 passes beneath the slide head 73, the cam raises the slide 72 and pawl 75; the pawl at the top of its stroke engages a tooth of the ratchet 79; as soon as the cam 69 moves clear of the head 73 the slide and pawl are depressed by the spring 74, which overcomes the spring 81 and rotates the ratchet and wheel 78 one step.

Figure 2:
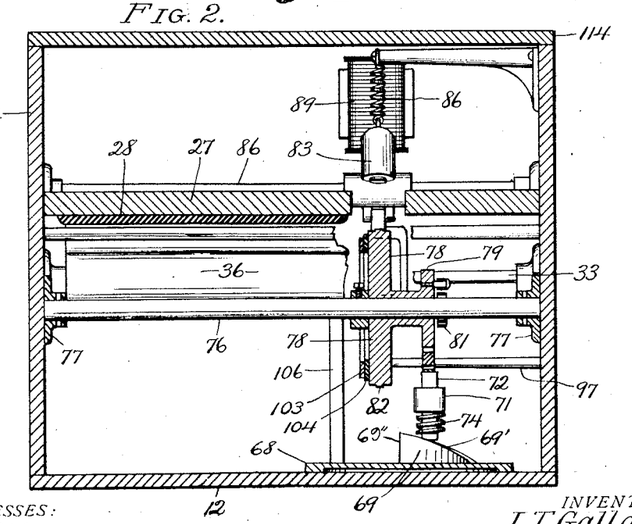
Fig. 2 is a vertical section on the line II—II of Fig. 1 omitting the record strip.

When the numeral wheel is at rest, one of the type 82 is directly beneath a printing head 83, on the end of a lever 84 pivoted on a shaft 85. This lever is urged upwardly by a spring 86. The bar 27 is recessed as shown in Fig. 2, to permit the head 83 to descend upon the paper 53 directly over a type. Lever 84 is provided with an extension 87 which is pivotally connected to the core 88 of a fixedly mounted solenoid 89. Actuation of the core by the solenoid moves the lever 84 downwardly and upon the breaking of the circuit the spring 86 restores the parts to normal.

Pivoted upon a rod 90 is a retaining pawl 91 which is pressed by a spring 92 against the ratchet 79 and prevents backward rotation of the numeral wheel except when the latter has made one revolution. This pawl 91 is provided with an extension or arm 93. Pivoted to the lever arm 87 and depending therefrom, is a trip 94, provided with a detent 95 which projects over the end of the pawl arm 93, when the core 88 is up. Integral with the trip 94 is a throw-off cam 96, which contacts a fixed rod or stud 97. This cam is so shaped that when the core 88 descends the detent 95 will first depress the pawl arm 93 from the full line position to the dotted-line position, thereby disengaging the pawl 91 from the ratchet 79; the trip 94 will then be swung to the right, disengaging the detent 95 from the pawl arm 93 and permitting the spring 92 to reëngage the pawl with the ratchet. Immediately following the disengagement of the pawl 91, it impinges upon the drive pawl 75, disengaging that also, and the spring 81 returns the type-wheel 78 back through one revolution to its starting position in which the zero is below the printing head.

When the ratchet returns to zero, in case the pawl 91 fails to stop it in time, it will nevertheless be stopped by the impingement of a member 98 upon a member 99, which members are hereinafter described.

In order to cause the solenoid 89 to operate at the proper time to set the type-wheel back to zero, the following electrical device is provided; reference being had to Figs. 2, 5 and 12. A striking pin or finger 98 is mounted on the numeral wheel 78. Adjacent to the zero position of said finger is a normally, open spring contact, member 99, close to which is a stationary contact point 100, which is electrically connected to circuit wire $52^b$.

In the actual construction shown in Figs. 1 and 4, the contact pieces 99 and 100 are mounted on insulation supported by a post 113, integral with the guide casting 70. Member 99 is connected by a wire $101^b$, to the contact strip 47 or to the wire $51^b$; the effect being the same in either case. When the parts 99 and 100 are in contact, a circuit will be closed through battery 49 and printing solenoid 89, except at certain times hereinafter referred to. In Fig. 5, the numeral wheel 78 is supposed to be at zero or starting position.

As many persons go aboard a train or disembark from same at some stations, and as the train is sometimes switched about in the yards just after leaving the station or arriving at one, it is obvious that the steps of the cars will be depressed many times, thereby causing as many operations of the pricking magnets, the paper feeding magnet, and the printing magnet 89. It is undesirable, however, to have the printing magnet operated every time a step is depressed, as one stroke of the printing head 83 is sufficient to print the numeral upon the paper strip. Therefore, to obviate such repeated movements of the printing head, 83, the setting back of the numeral wheel is utilized for actuating means for opening the printing solenoid circuit immediately after each operation of said solenoid. To this end I mount upon the wheel 78 a concentric C shaped contact piece 103 which is insulated from the wheel 78, by a disk 104. Positioned at or near the gap in said contact piece are a pair of insulated brushes 105, mounted upon a post 106; they being so arranged as to be electrically unconnected when the wheel is at zero, and therefore, until the train has traveled one mile forward. From one brush 105, a conductor $107^c$ leads to the solenoid 89; from the solenoid 89 a conductor $108^c$ leads to the battery 49; and from the other brush 105, a conductor $112^c$ leads to the relay contact 46. Close to contact 46 is a contact point 110, which is connected by wires $109^c$ and $51^b$ to the battery 49. As soon as the train has proceeded one mile, the numeral wheel 78 will be turned one step and one end of the contact piece 103 will pass beneath both brushes 105. Thereafter, should any person step on or off the car, the relay points 46, 110 will be closed and the solenoid 89 will be energized and operate the printing head 83, pressing the strip 53 upon a numeral 82 which registers the distance of the train from its starting point. The wheel 78 will be turned, step by step, until its highest type numeral comes beneath the printing head. The pin or finger 98 is so positioned that the final fraction of an inch of the wheel's movement will cause the part 98 to move the spring contact 99 into contact with point 100; the effect of which will be the closure of a circuit through the paper-feed solenoid 40 and battery 49. The movement of the core-arm 45 and point 46 will then send current through wire $112^c$, brushes 105, segment 103, wire $107^c$, solenoid 89, wire $108^c$, battery 49, wire $51^b$, and wire $109^c$, to contact point 110. The solenoid 89 will actuate the printing head 83, which will press the strip 53 upon the highest numbered type, which in this case is "7." See Fig. 13, lower edge of strip 53. The numeral wheel is immediately reset at zero in the manner hereinbefore described, and the winding motion of the numeral wheel recommences at the next mile traveled. Thus the distance is recorded by repetitions of the high number, whatever, that may be. For example, a total of nine of the high figures "7" on the strip would indicate a run of 63 miles. It will now be clear that whenever the printing head 83 is depressed once, the numeral wheel will be thrown back to zero, (regardless of the position of the train on the line) thereby opening the printing circuit and rendering the printer inoperative until the train has proceeded at least one mile farther. This obviates the undesirable repetition of printed numerals that would otherwise occur.

It will seldom happen that a station on the line will be at a distance equal to a multiple of the high numeral on the wheel; hence, when persons board or leave a car at a station the apparatus will print some lesser numeral, or in the present case, any numeral from 1 to 7.

Figure 13:
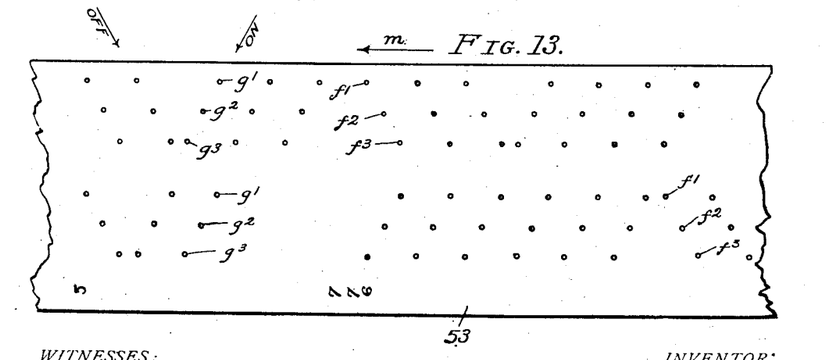
Fig. 13 represents a fragment of the record strip with records marked, pricked or punched therein.

As the numerals on the strip 53 correspond in position with the marks $g^1$, $g^2$, $f^1$, $f^2$, etc. the clerk whose duty it is to transcribe from the strip may ascertain at what distances the passengers boarded or left the car by adding together the numerals on the strip to the points in question. For example: following the numerals 8, 8 and 3, on the strip, the reader sees marks $g^1$, $g^2$, $g^3$, indicating that one person boarded the car. The distance from the starting point was therefore 19 miles. Following the said marks, the numerals 8, 8, 5, 8, 2 appear, followed by marks $f^1$, $f^2$, $f^3$, indicating that a person left the car at a point 31 miles from the preceding stopping point.

As each group of three marks on the strip represents one person, the number of persons boarding and leaving the car at any point will be ascertained by counting the groups, the two kinds of which have already been distinguished from each other.

At the end of a run the marked strip is removed and if the paper has all been used from the roll 36, a fresh roll is placed upon the shaft 33 and attached to the shaft 30.

In order to prevent any tampering with the mechanism, the box 12 is provided with a hinged cover 114, and with a hasp 115, and padlock 116 for locking the cover in closed position; the key of the padlock being carried by the person authorized to remove and insert the record strips.

The mechanisms herein illustrated are only typical, and may be modified in many respects without departing from the spirit and scope of my invention.

Having now described my invention, what I claim as new and desire to secure by Letters Patent is:—

1. In a passenger coach, a housing; two reels therein; a support for a record strip extending from reel to reel; means for intermittently turning one of the reels; a numeral wheel positioned to print numerals upon said strip; a movable printing head opposite said wheel; an electromagnet for operating the printing head; means actuated by the entrances and exits of passengers for actuating said electromagnet; a track wheel; a cam shaft extending into said housing; gearing between said track wheel and cam shaft; a cam carried by said shaft; a pawl actuated by said cam; a ratchet wheel adapted to rotate the numeral wheel and actuable by said pawl; means actuated by said electromagnet for disengaging said pawl at the completion of one revolution of said wheel; a spring for returning said wheel to zero position; and means permitting reëngagement of the pawl with the ratchet.

2. In a passenger coach, a housing; two reels therein; a support for a record strip extending from reel to reel; means for intermittently turning one of the reels; a numeral wheel positioned to print numerals upon said strip; a movable printing head opposite said wheel; an electromagnet for operating the printing head; means actuated by the entrances and exits of passengers for actuating said electromagnet; a track wheel; a cam shaft extending into said housing; gearing between said track wheel and cam shaft; a cam carried by said shaft; a pawl actuated by said cam; a ratchet wheel adapted to rotate the numeral wheel and actuable by said pawl; means actuated by said electromagnet for disengaging said pawl at the completion of one revolution of said wheel; a spring for returning said wheel to zero position; means permitting reëngagement of the pawl with the ratchet; means for holding the circuit of said electromagnet open when the numeral wheel is at zero position, and means for holding said circuit closed in other positions of said wheel.

3. In a passenger coach, a housing; electromagnetic strip-feeding means therein; a support for a record strip engaged by said means; a rotary printing device adapted to print consecutive numerals upon the strip; a movable printing head opposite said device; an electromagnet for actuating the printing head; means actuated by the entrances and exits of passengers for actuating the strip-feeding means and the printing magnet; means actuated by one full revolution of the numeral wheel, to actuate said strip-feeding means; a track wheel; means driven by the track wheel for rotating the numeral wheel step by step whereby the numerals are brought successively into printing positions; and automatic means for returning the numeral wheel to zero at the completion of one revolution thereof.

4. In a passenger coach, a housing; two reels therein; a support for a record strip extending from reel to reel; means for intermittently turning one of the reels; a numeral wheel positioned to print numerals upon said strip; a movable printing head opposite said wheel; an electromagnet for operating the printing head; means actuated by the entrances and exits of passengers for actuating said electromagnet; a track wheel; means actuated by the track wheel for rotating the numeral wheel step by step whereby the numerals are brought successively into printing positions; and automatic means for returning the numeral wheel to zero at the completion of one revolution thereof.

5. In an apparatus of the kind described, a printing lever, a solenoid for actuating same, a numeral wheel, a ratchet wheel for rotating the numeral wheel, a driving pawl, a retaining pawl, adapted when disengaged to disengage the driving pawl, a trip connected to said printing lever, a detent on said trip, adapted to disengage the retaining pawl, a throw-off cam on said trip, a fixed member adapted to actuate said cam for releasing the pawl from the detent, and a spring for returning the numeral wheel to initial position.

6. In an apparatus of the kind described, an intermittently rotative numeral wheel, a coactive printing head, a support for a record strip passing between said wheel and head, strip-feeding means, an electromagnet for actuating said means, an open circuit for said electromagnet; and means carried by said wheel for closing said circuit upon the completion of one revolution of said wheel.

7. In an apparatus of the kind described, an intermittently rotative numeral wheel, a coactive printing head, a support for a record strip passing between said wheel and head, an electromagnet for actuating the printing head, a segmental contact piece mounted upon said wheel, insulation between the ends of said piece, insulated contact brushes adapted to simultaneously bear upon said contact piece or insulation, and an energizing circuit for said electromagnet; said brushes being connected in series in said circuit and being so positioned that said circuit will be open when the numeral wheel is at zero position and closed when said wheel is at any other printing position.

8. In a passenger car, a series of marking devices provided with actuating magnets; a support for a record strip; a strip-feeding device provided with an actuating magnet; a numeral printing device provided with an actuating magnet; means actuated by entrances and exits of passengers for energizing said marker actuating magnets; relays actuated by the marker actuating magnets for energizing the strip-feeding magnet; a relay actuated by the strip-feeding magnet for energizing the numeral printing magnet; and power circuits for operating said magnets.

9. In a passenger car, a series of marking devices provided with actuating magnets; a support for a record strip; a strip-feeding device provided with an actuating magnet; a numeral printing device provided with an actuating magnet; a set of independently movable car steps; circuit closers actuated by depression of said steps; energizing circuits including said circuit closers and said marker actuating magnets; relays actuated by the marker actuating magnets for energizing the strip-feeding magnet; a relay actuated by the strip-feeding magnet for energizing the numeral printing magnet; and power circuits for operating the strip-feeding and numeral printing magnets.

10. A record strip marking device comprising an electromagnet, a movable armature adapted for actuation by the magnet, a spring acting on the armature in opposition to the magnetic force, an angle lever pivoted adjacent said core and adapted for actuation by said armature, a rod carried by said lever, a weight on said rod, an upwardly directed marking point carried by said rod, and a platen in the path of said marking point.

11. A record strip marking device comprising an electromagnet, a movable armature adapted for actuation by the magnet, a spring acting on the armature in opposition to the magnetic force, an angle lever pivoted adjacent said core and adapted for actuation by said armature, a rod carried by said lever, a weight on said rod, an upwardly directed marking point carried by said rod, a circuit closing device carried by said armature, an electromagnet for operating a strip-feeding mechanism, and a circuit including said magnet and circuit closing device.

In testimony whereof I affix my signature, in the presence of two witnesses.

JAMES T. GALLAHER.

Witnesses:
NINA C. DENTON,
ALEXANDER M. CRAIG.